United States Patent
Clark et al.

(10) Patent No.: US 8,168,046 B2
(45) Date of Patent: May 1, 2012

(54) METHOD AND APPARATUS FOR TREATING A COMPONENT OF A GAS TURBINE ENGINE

(75) Inventors: Daniel Clark, Derbyshire (GB); Stephen Tuppen, Derbyshire (GB); Wayne Eric Voice, Nottingham (GB)

(73) Assignee: Rolls-Royce PLC (GB)

( * ) Notice: Subject to any disclaimer, the term of this patent is extended or adjusted under 35 U.S.C. 154(b) by 1231 days.

(21) Appl. No.: 11/873,480

(22) Filed: Oct. 17, 2007

(65) Prior Publication Data

US 2008/0169204 A1 Jul. 17, 2008

(30) Foreign Application Priority Data

Oct. 25, 2006 (GB) .................................. 0621184.1

(51) Int. Cl.
*C25F 7/00* (2006.01)
(52) U.S. Cl. ........................................ 204/245; 205/668
(58) Field of Classification Search .................. 204/245; 205/668
See application file for complete search history.

(56) References Cited

U.S. PATENT DOCUMENTS

| | | | |
|---|---|---|---|
| 2,780,594 A * | 2/1957 | Dailey John J | 205/723 |
| 3,637,468 A * | 1/1972 | Icxi et al. | 205/118 |
| 4,522,692 A | 6/1985 | Joslin | |
| 4,566,939 A | 1/1986 | Miller et al. | |
| 4,802,828 A | 2/1989 | Rutz et al. | |
| 5,117,087 A | 5/1992 | Baker et al. | |
| 5,262,193 A | 11/1993 | Louks et al. | |
| 5,359,770 A | 11/1994 | Brown et al. | |
| 5,430,666 A | 7/1995 | Deangelis et al. | |
| 5,455,998 A | 10/1995 | Miyazono et al. | |
| 5,571,430 A | 11/1996 | Kawasaki et al. | |
| 5,702,574 A | 12/1997 | Foster et al. | |
| 5,940,037 A | 8/1999 | Kellerman et al. | |
| 5,952,110 A | 9/1999 | Schell et al. | |
| 5,959,770 A | 9/1999 | Perkins et al. | |
| 5,997,248 A | 12/1999 | Ghasripoor et al. | |
| 6,645,572 B2 | 11/2003 | Seifert | |
| 6,940,037 B1 | 9/2005 | Kovacevic et al. | |
| 7,077,945 B2 * | 7/2006 | Bergsma et al. | 205/380 |
| 7,214,904 B2 | 5/2007 | Zeltner | |
| 7,422,677 B2 * | 9/2008 | Mazur et al. | 205/662 |

(Continued)

FOREIGN PATENT DOCUMENTS

EP 1365107 A1 11/2003

(Continued)

OTHER PUBLICATIONS

Takaya Matsufumi et al., "Electrodeposition of Chronium-silicon carbide composite coatings and their wear characteristics", Kinzoku Gijutsu, 1987, vol. 38(3), 97-101, Japan.

*Primary Examiner* — Alexa D. Neckel
*Assistant Examiner* — Nicholas A. Smith
(74) *Attorney, Agent, or Firm* — McCormick, Paulding & Huber LLP

(57) ABSTRACT

A surface treatment device for applying a surface treatment medium to an article is provided with the surface treatment device having an application member for applying the surface treatment medium to the article and an electrode, which applies an electrical potential between the application member and the article. The device provides localized treatment to the article and can remove oxide layers or the like from metallic materials without removing or damaging the underlying metallic material.

14 Claims, 2 Drawing Sheets

U.S. PATENT DOCUMENTS

| | | |
|---|---|---|
| 7,651,658 B2 | 1/2010 | Aimone et al. |
| 7,744,967 B2 | 6/2010 | Gourbesville et al. |
| 7,790,014 B2 * | 9/2010 | Fray et al. ............ 205/640 |
| 2004/0022957 A1 | 2/2004 | Thompson et al. |
| 2005/0016854 A1 * | 1/2005 | Chen et al. ............ 205/51 |
| 2005/0023257 A1 | 2/2005 | Pyritz et al. |
| 2005/0056628 A1 | 3/2005 | Hu |
| 2005/0247570 A1 | 11/2005 | Langeder et al. |
| 2007/0003416 A1 | 1/2007 | Bewlay et al. |
| 2007/0187257 A1 * | 8/2007 | Noji et al. ............ 205/640 |

FOREIGN PATENT DOCUMENTS

| | | |
|---|---|---|
| EP | 1437425 | 7/2004 |
| EP | 1600248 A2 | 11/2005 |
| FR | 2688575 A1 | 9/1993 |
| GB | 1065858 A | 4/1967 |
| GB | 2034752 A | 6/1980 |
| GB | 2241506 A | 4/1991 |
| GB | 2241506 A | 9/1991 |
| GB | 2449862 A | 12/2008 |
| JP | 04182085 A | 6/1992 |
| JP | 7040145 A | 2/1995 |
| SU | 771172 B * | 10/1980 |
| WO | 99/64638 A1 | 12/1999 |
| WO | 9964636 A1 | 12/1999 |
| WO | WO 99/64638 | 12/1999 |
| WO | 2004033384 A1 | 4/2004 |
| WO | 2005/038096 A1 | 4/2005 |
| WO | 2009011973 A1 | 1/2009 |

* cited by examiner

METHOD AND APPARATUS FOR TREATING A COMPONENT OF A GAS TURBINE ENGINE

CROSS-REFERENCE TO RELATED APPLICATION

This application is entitled to the benefit of British Patent Application No. GB 0621184.1 filed on Oct. 25, 2006.

FIELD OF THE INVENTION

This invention relates to surface treatment devices. More particularly, but not exclusively, this invention relates to surface treatment devices for applying etching media to articles, such as metallic articles. Embodiments of this invention relate to surface treatment devices for applying etching media to prepare a region of a fan blade for further treatment.

BACKGROUND OF THE INVENTION

Gas turbine engines incorporate combined discs and blades, where the blades are integrally mounted on the disc. These components are known in the art as "blisks". If the blisks suffer damage during normal service then repair or salvage operations may be required to refurbish them. This typically involves metal deposition or other suitable welding process. The region to be repaired is generally the leading edge of the aerofoil blade of the sections of the blisk blade. A local post repair or post salvage heat treatment process is required to relieve stress of the repair. Also it is often necessary to apply an etching medium to the blisk in order to remove the inherent surface oxide layer.

Etching mediums for gas turbine components are typically acid etching mediums. These mediums can also remove the metal material beneath the surface oxide area. Particularly in the field of gas turbine engines the removal of metal from high value parts is considered disadvantageous given the high tolerance requirements for parts.

A process known as the FFC process uses a molten metallic salt ($M_2Y$) to remove oxides from the surface of articles, such as articles made of titanium, using electrolysis such that reaction of the oxide layer occurs rather than $M_2$ deposition. The known process, described in WO99/64638, places the whole article in the molten metallic salt.

Processing tanks are, on the whole, bulky and require large quantities of chemicals, which have a negative environmental impact. Also, it is often the case that the articles being treated have parts that are more sensitive than others and by placing the whole article within the treatment tank damage may occur to the more temperature sensitive areas.

SUMMARY OF THE INVENTION

According to a first aspect of the invention there is provided a surface treatment device for applying a metallic salt to an article, the surface treatment device having means for supplying the metallic salt in molten form to an application member extending partially about the article, the application member having an electrode for applying an electrical potential between the application member and the article through the molten metallic salt, characterised in that in-use non-molten metallic salt provides a seal which inhibits leakage of the molten metallic salt from the application member.

Preferably, the metallic salt is calcium chloride.

Preferably, the application member is shaped to conform to a surface of the article to be treated. The application member may have an inner surface which opposes at least a portion of the article to be treated.

The electrode may be located on the inner surface and comprises a layer of a carbon. The application member may have a heating element for supplying heat to the treatment medium.

Preferably, the surface treatment device has means to remove the metallic salt from the application member for allowing a flow of salt therethrough.

The surface treatment device may further comprise an inert atmosphere in which the application member and article are located during supply of the molten salt to the application member.

According to a second aspect of the invention, there is provided an electrochemical circuit comprising a surface treatment device according to any one of the preceding claims and an article to be treated acting as a second electrode.

DETAILED DESCRIPTION OF THE PREFERRED EMBODIMENTS

Figure 1:
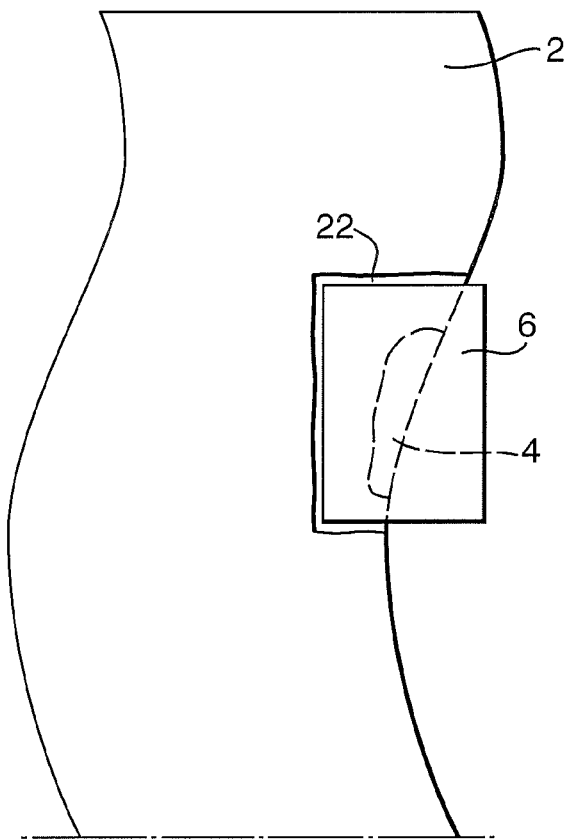
FIG. 1 is a simplified skematic illustration depicting a surface treatment device provided in accordance with the present invention mounted on an article.
Figure 3:
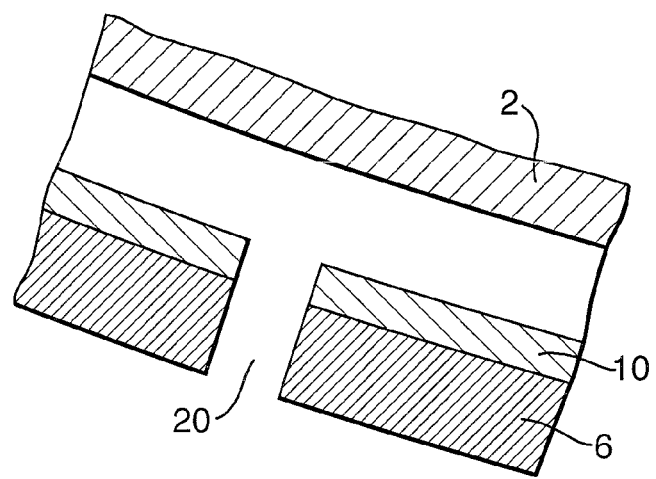
FIG. 3 depicts an electrode arrangement for the surface treatment device of FIG. 1.
Figure 2:
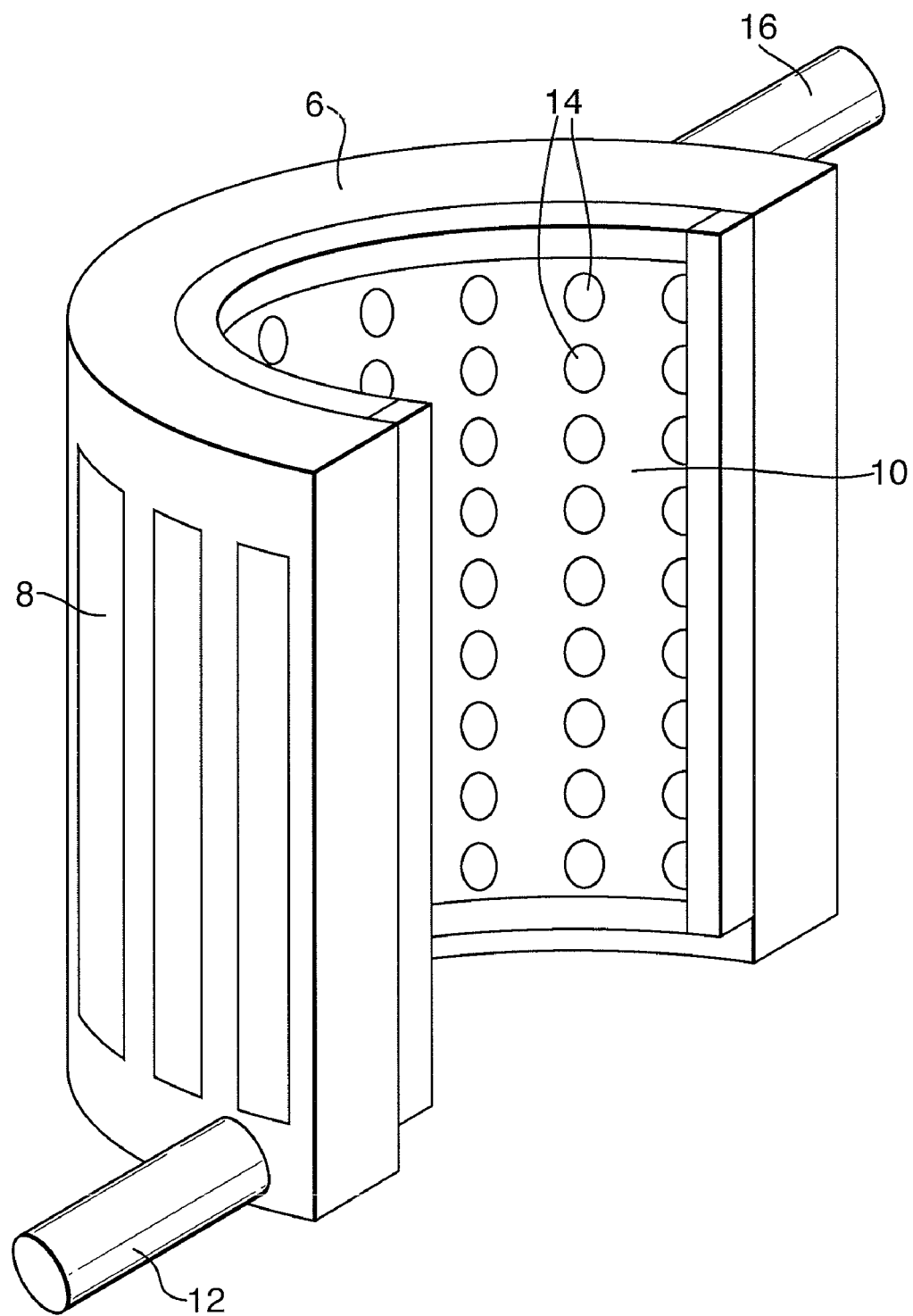
FIG. 2 is a diagrammatic view of the surface treatment device of FIG. 1.

Referring to FIG. 1 there is depicted a fan blade 2 with a region 4, which requires treatment. A surface treatment device or sheath 6 is placed in location around the region leaving a 0.5 to 1 mm clearance between the surface of the blade and the sheath. As can be seen in greater detail in FIG. 2 the surface treatment device 6 is generally "C" shaped and delivers a metered quantity of molten deoxidation salt, preferably calcium chloride, or a blend thereof, to the region to be treated.

The sheath 6 is provided with heating elements 8, which help to maintain the salt in the dearance between the sheath 6 and the blade 2 at a temperature of around 800° C. to 900° C. The sheath is formed using a lost wax process and is preferably of yttria.

The sheath has an internal cavity into which the etching material is supplied through a conduit 12. The conduit is provided at the base of the conduit and the etchant fills the internal cavity. An array of apertures 14 is provided in the internal surface of the sheath, which extend between the internal cavity and the spacing between the blade and sheath. Etchant is supplied to the spacing between the blade and sheath through the apertures 14.

The etchant is preferably continuously circulated through the sheath and the sheath is therefore provided with an outlet conduit 16 through which the etchant is removed from the sheath to allow it to be prepared for re-supply to the sheath.

The calcium chloride removes oxide ions from the region by high temperature electrolysis. A carbon lining is provided on the internal surface 10 of the sheath to provide a first electrode and is connected to a current through a carbon plug 20 that extends through the wall of the sheath. The fan blade 2 forms the second electrode.

In operation granulated salt is heated to melting point in a remote ceramic or carbon based crucible surrounded by an induction coil arrangement. After melting the molten salt is supplied to the sheath, which has been pre-aligned to the component via the use of a guide rail (not shown) which allows for position and orientation control. A heat and corrosion resistant clamp holds the sheath in press contact with the surface.

The molten salt is kept molten by secondary heating elements 8 mounted on or within the sheath for 1 to 2 hours to allow the oxide layer to be removed.

A current of the order of tens of watts per $mm^2$ is applied to the electrode 10 and a field applied across the molten salt to the fan blade.

The molten salt is continuously circulated through the shroud 6, through a heater and back into the shroud. The salt cools at the edges of the shroud to a temperature at which it solidifies and the salt is then used to provide an inert, integral seal 22 around the shroud, which is sufficient to prevent leakage, or further leakage of molten salt from the shroud.

It is desirable to place the article and surface treatment device within an inert atmosphere or within a vacuum prior and during treatment. This protective atmosphere inhibits oxidation of the article beyond the area in contact with the molten salt.

Once the oxide has been removed the system is detached from the supply of salt and the molten salt remaining within the shroud is drained. Adherent salt is removed and washed away by hot de-mineralised water. The discharge is collected and removed in an environmentally responsible manner. The salt may be recycled for further use.

Various modifications may be made without departing from the inventive concept.

It is an advantage of the above-described embodiments that they provide only localised treatment of a blade and remove oxide layers from metallic materials without removing or damaging the underlying metallic material. Further an additional heat treatment step occurs simultaneously with the oxide removal. The heat treatment can be used to provide stress relief to the article removing the need for subsequent treatment.

We claim:

1. A surface treatment device for applying a metallic salt to an article, the surface treatment device comprising:
   an application member extending partially about the article, said application member having an electrode for applying an electric potential between the application member and the article; and
   a means for supplying the metallic salt in molten form to said application member such that said applied electric potential extends through the molten metallic salt, and in-use non-molten metallic salt provides a seal which inhibits leakage of the molten metallic salt from the application member.

2. A surface treatment device according to claim 1, wherein the metallic salt is calcium chloride.

3. A surface treatment device according to claim 1, wherein the application member is shaped to conform to a surface of the article to be treated.

4. A surface treatment device according to claim 1, wherein the application member has an inner surface which opposes at least a portion of the article to be treated.

5. A surface treatment device according to claim 4, wherein the electrode is located on the inner surface and comprises a layer of a carbon.

6. A surface treatment device according to claim 1, the application member having a heating element for supplying heat to the metallic salt.

7. A surface treatment device according to claim 1, the surface treatment device having means to remove the metallic salt from the application member for allowing a flow of salt therethrough.

8. A surface treatment device according to claim 1, further comprising an inert atmosphere in which the application member and article are located during supply of the molten salt to the application member.

9. A method of treating a surface of an article with a metallic salt, said method comprising the steps of:
   providing an application member configured to extend partially about the article;
   supplying a metallic salt in a molten form to said application member; providing said application member with an electrode for applying an electric potential between the application member and the article;
   applying said molten metallic salt to the article surface through said electric potential such that in-use non-molten metallic salt provides a seal which inhibits leakage of the molten metallic salt from the application member; and
   providing a means to remove the metallic salt from the application member for allowing a flow of salt therethrough.

10. The method of claim 9 wherein said step of providing an application member further comprises the step of shaping said application member to conform to a surface of the article to be treated.

11. The method of claim 9 wherein said step of providing an application member further comprises the step of providing the application member with an inner surface which opposes at least a portion of the article to be treated.

12. The method of claim 11 wherein said step of providing an application member further comprises the step of providing the application member with an inner surface having the electrode and further includes a layer of carbon.

13. The method of claim 9 wherein said step of providing an application member further comprises the step of providing the application member with a heating element for supplying heat to the metallic salt.

14. The method of claim 9 further comprising the step of providing an inert atmosphere in which the application member and article are located when supplying the molten salt to the application member.

* * * * *